United States Patent [19]
Jaakkola

[11] Patent Number: 5,892,799
[45] Date of Patent: Apr. 6, 1999

[54] METHOD IN CONNECTION WITH A QAM RECEIVER AND AN IMPROVED QAM RECEIVER

[75] Inventor: Reijo Jaakkola, Hämeenkoski, Finland

[73] Assignee: Nokia Technology GmbH

[21] Appl. No.: 744,866

[22] Filed: Nov. 7, 1996

[30] Foreign Application Priority Data

Nov. 8, 1996 [FI] Finland .................................. 955364

[51] Int. Cl.$^6$ .............................. H03D 1/00; H03D 3/18; H04N 5/44; H04N 5/50
[52] U.S. Cl. ......................... 375/340; 375/327; 348/725; 348/731
[58] Field of Search ..................................... 375/340, 298, 375/320, 344; 348/725, 726, 731, 732; 375/327

[56] References Cited

U.S. PATENT DOCUMENTS

| | | | |
|---|---|---|---|
| 5,175,626 | 12/1992 | White ....................................... | 348/731 |
| 5,235,424 | 8/1993 | Wagner et al. .......................... | 348/678 |
| 5,268,761 | 12/1993 | White ....................................... | 348/678 |
| 5,588,025 | 12/1996 | Strolle et al. ............................ | 375/316 |
| 5,694,419 | 12/1997 | Lawrence et al. ...................... | 275/222 |

*Primary Examiner*—Chi H. Pham
*Assistant Examiner*—Khai Tran
*Attorney, Agent, or Firm*—Ware, Fressola, Van Der Sluys & Adolphson LLP

[57] ABSTRACT

The invention relates to a method in connection with a QAM receiver wherein, particularly when making use of a 32QAM, 64QAM demodulator lator a like, a digital transmission signal (1) to be transmitted is down-converted in a tuner and band-filtered with a first filter to a preferably fixed, standard intermediate frequency (5). This is followed by a further subsequent down-conversion by a first oscillator and filtering with a second filter to a so-called low intermediate frequency (6) which is equal to the symbol rate used in image transmission or its low odd multiple, whereafter an AD converter (7) is used under the synchronization of a second oscillator (8) for picking up samples (X) from the symbol sequence of a processed signal (6) to a demodulator (9), capable of regulating the above-mentioned, preferably voltage-controlled oscillators. Particularly in order to provide a variable-rate transmission signal, said low intermediate frequency signal (6), such as the mean frequency and bandwidth of its spectrum, is measured by of a measuring system (11), the measuring results thereof being used for controlling the oscillators (4, 8) in such a manner that the fixed-rate demodulator (9) can be locked to the signal. The invention relates also to a QAM receiver operating in accordance with the method.

12 Claims, 4 Drawing Sheets

METHOD IN CONNECTION WITH A QAM RECEIVER AND AN IMPROVED QAM RECEIVER

TECHNICAL FIELD

The present invention relates to a method in connection with a QAM receiver wherein, particularly when making use of multi-state modulation, such as a 32QAM, 64QAM demodulator or a like intended for a fixed symbol rate, a transmission signal relating to a digital television, video or like image to be transmitted is down-converted in a tuner and band-filtered with a first filter to a fixed, substantially 40 MHz standard intermediate frequency. This is followed by a further subsequent down-conversion by means of a first oscillator and filtering with a second filter to a so-called low intermediate frequency which is equal to the symbol rate used in image transmission or its low odd multiple, whereafter an AD converter is used under the synchronization of a second oscillator for picking up samples from the symbol sequence of a processed signal to a demodulator, capable of regulating the above-mentioned, preferably voltage-controlled oscillators for maintaining at least the correct tuning and symbol synchronization, and preferably also amplification, particularly for intensifying the dynamics of AD conversion.

BACKGROUND OF THE INVENTION

For the above type of QAM receivers it has been relatively easy to develop a demodulator for a signal whose symbol rate is known with a reasonable accuracy. Components operating this way have in fact been commercially available for some time. Generally speaking, however, the transmission of a digital television image is just being introduced and, thus, the pertinent standards and interpretations thereof are still somewhat open. In the prior art solutions, the symbol rate has been usually identified by means of a feedback loop which, if necessary, has employed the feedback of possibly demodulated symbols.

Hence, in digital television image transmission, especially in a cable network, the modulation method used currently is a multi-state QAM, having a spectrum which is quite sharp-edged and, thus, the signal itself contains quite a bit of synchronization information. A result of this is that the carrier frequency and symbol rate of a signal must be set at a relatively high accuracy, before the synchronization based on a feedback loop is able to lock itself. In digital video, the bandwidth of a signal is typically about 7 MHz and the locking range is a few tens of kHz's. In case the symbol rate is unknown or may vary over a wide range, the correct rate must be searched in current solutions by adjusting the locking at various rates, which are generally quite close to each other at equal intervals. Therefore, at a fluctuating symbol rate, the searching time will often be unacceptably long and tedious.

SUMMARY OF THE INVENTION

An object of a method of this invention is to provide a decisive remedy to the above-mentioned problems and hence to raise substantially the available prior art. In order to achieve this object, a method of the invention is principally characterized in that, particularly in order to provide a variable-rate transmission signal, the low intermediate frequency signal, such as the mean frequency and bandwidth of its spectrum, is measured by means of a measuring system, the measuring results thereof being used for controlling the oscillators in such a manner that the fixed-rate demodulator can be locked to the signal.

The most significant benefits of a method of this invention are simplicity and operating reliability whereby it is possible, by quite simple arrangements, to employ a demodulator intended for a fixed symbol rate for receiving a variable-rate signal. The simplicity of a method of the invention is based on a measuring system which is connectable to a QAM receiver or in association therewith and is quite simple in operating principle and which is capable of measuring a symbol rate, on which basis a micro-controller is preferably used for further processing the signal to a mode suitable for the demodulator.

The invention relates also to a QAM receiver in which the method is exploited.

The QAM receiver of the invention includes a measuring system which is quite simple in principle and which can be used in a simple and reliable fashion to exploit a demodulator intended for a fixed symbol rate for receiving a variable-rate signal. The measuring system of the invention includes preferably three power measuring branches to which a sequence of samples is fed in addition to a demodulator for controlling the oscillators, which control the down-conversion frequency and the sample frequency of an AD converter, on the basis of the measuring results most preferably by means of a micro-controller. Thus, the measuring system preferably measures the mean frequency and bandwidth of a low intermediate-frequency signal and adjusts oscillators voltage-controlled on the basis thereof so close to a correct value that a fixed-rate demodulator is capable of locking itself to the signal.

BRIEF DESCRIPTION OF THE DRAWINGS

In the following specification, the invention will be described in detail with reference made to the accompanying drawings, in which.

BEST MODE FOR CARRYING OUT THE INVENTION

Figure 1:
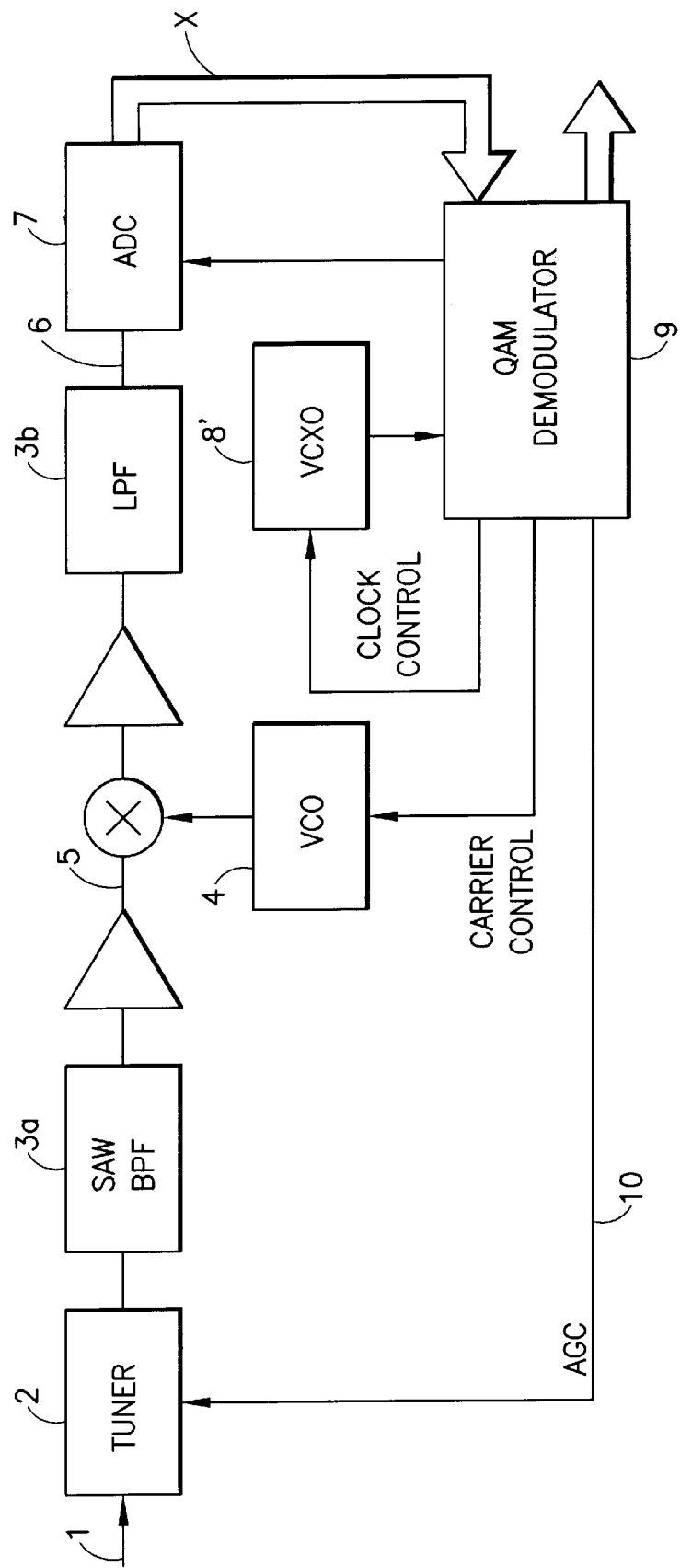
FIG. 1 depicts a basic example of an operating chart for a conventional QAM receiver.
Figure 2:
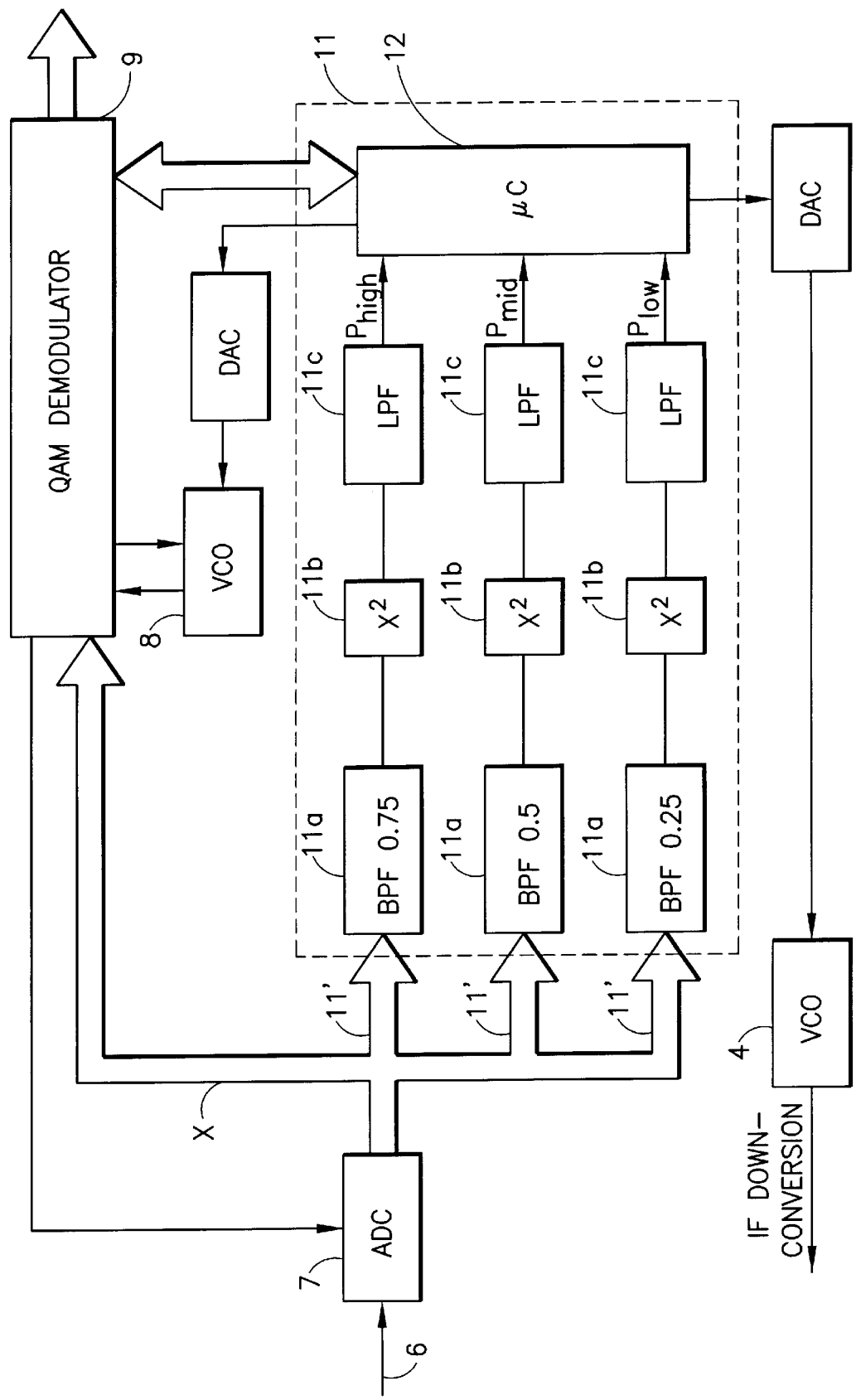
FIG. 2 depicts one preferred measuring system operating on a method of the invention e.g. in connection with the QAM receiver shown in FIG. 1.

As best seen in FIG. 1, the invention relates to a method in connection with a QAM receiver wherein, particularly when making use of multi-state modulation, such as a 32QAM, 64QAM demodulator or a like intended for a fixed symbol rate, a transmission signal 1 relating to a digital television, video or like image to be transmitted is down-converted in a tuner 2 and band-filtered with a first filter 3a to a fixed, substantially 40 MHz standard intermediate frequency 5. This is followed by a further subsequent down-conversion by means of a first oscillator 4 and filtering with a second filter 3b to a so-called low intermediate frequency 6, which is equal to the symbol rate used in image transmission or its low odd multiple, whereafter an AD converter 7 is used under the synchronization of a second oscillator 8 for picking up samples X from the symbol block of a processed signal 6 to a demodulator 9, capable of regulating the above-mentioned, preferably voltage-controlled oscillators 4, 8 for maintaining at least the correct tuning and symbol synchronization, and preferably also amplification 10, particularly for intensifying the dynamics of AD conversion. As seen in FIG. 2 and particulary in order to provide a variable-rate transmission signal, said low intermediate frequency signal 6, such as the mean frequency and bandwidth of its spectrum, is measured by means of a measuring system 11, the measuring results thereof being used for controlling the oscillators 4, 8 in such a manner that the fixed-rate demodulator 9 can be locked to the signal.

In a preferred application of the method, a sequence of samples X picked up from the processed signal 6 is delivered not only to the demodulator 9 but also to at least three power measuring branches 11', the 3 measuring results determined thereby and representing said transmission signal being used for controlling said oscillators 4, 8 by means of a micro-controller 12. When utilizing conventional technology, wherein four samples X are picked up from a symbol sequence of said low intermediate frequency signal 6 for the demodulator 9, said measuring results are interpreted by means of the micro-controller 12 for adjusting the down-conversion frequency 4 and the sample frequency 8 of an AD-converter, such that the low intermediate frequency will be substantially equal to the symbol rate and the sample frequency four times higher than the symbol rate.

In a further preferred application of the method, each power measuring branch 11' is at least provided with a digital narrow bandpass filter 11a and thereafter a combination logic 11b, most preferably one for each power measuring branch, and used for calculating the square or instantaneous power of a sample value, followed by averaging the determined power values by means of a low pass system 11c. In this connection, the narrow bandpass filters 11a are tuned to frequencies $\frac{1}{4}f_N$, $\frac{1}{2}f_N$ and $\frac{3}{4}f_N$, wherein $f_N$ is a half of the sample frequency, i.e. a so-called Nyquist frequency.

FIG. 1 shows one conventional QAM receiver assembly, comprising a tuner 2 for down-converting a transmission signal 1, a first low pass filter 3a for band filtering the same by means of a first oscillator 4 e.g. to a 40 MHz standard intermediate frequency 5, a second low pass filter 3b for down-converting the signal further to a so-called low intermediate frequency 6, an AD converter 7 for picking up samples under the synchronization of a second oscillator 8 from a symbol block of the processed signal 6 and further a demodulator 9 for controlling the oscillators 4, 8 and preferably also amplification 10.

FIG. 2 shows further an application of the method in connection with a QAM receiver as described above, in which a low intermediate frequency signal 6 is sampled by means of an AD converter 7 in synchronization with an oscillator 8 and which is provided with a symbol rate detector functioning according to the invention.

Thus, a sequence of samples obtained as described above in connection with a conventional QAM receiver shown in FIG. 1 can be readily processed to disperse a basic frequency signal into a cophasal and a cross-phasal section. The following chart demonstrates the dispersion.

All samples: $a_1\ a_2\ a_3\ a_4\ a_5\ a_6\ a_7\ a_8\ a_9\ a_{10}\ a_{11}\ a_{12} \ldots$
Cophasal: $a_1\ -a_3\ a_5\ -a_7\ a_9\ -a_{11} \ldots$
Cross-phasal: $a_2\ -a_4\ a_6\ -a_8\ a_{10}\ -a_{12} \ldots$ Thus, the demodulator regulates the voltage-controlled local oscillator 4 and crystal oscillator 8' so as to maintain proper tuning and symbol synchronization. Amplification 10 is also controlled by the demodulator 9 in such a manner that the dynamics of AD conversion will be utilized as well as possible.

This type of traditional QAM receiver is only capable of synchronizing itself with a signal if its carrier frequency and symbol rate are known with a reasonable accuracy, which on the one hand is due to the slowness of synchronization algorithms and on the other hand to the fact that modulation produces very meager information about carrier frequency and symbol rate.

Figure 3:
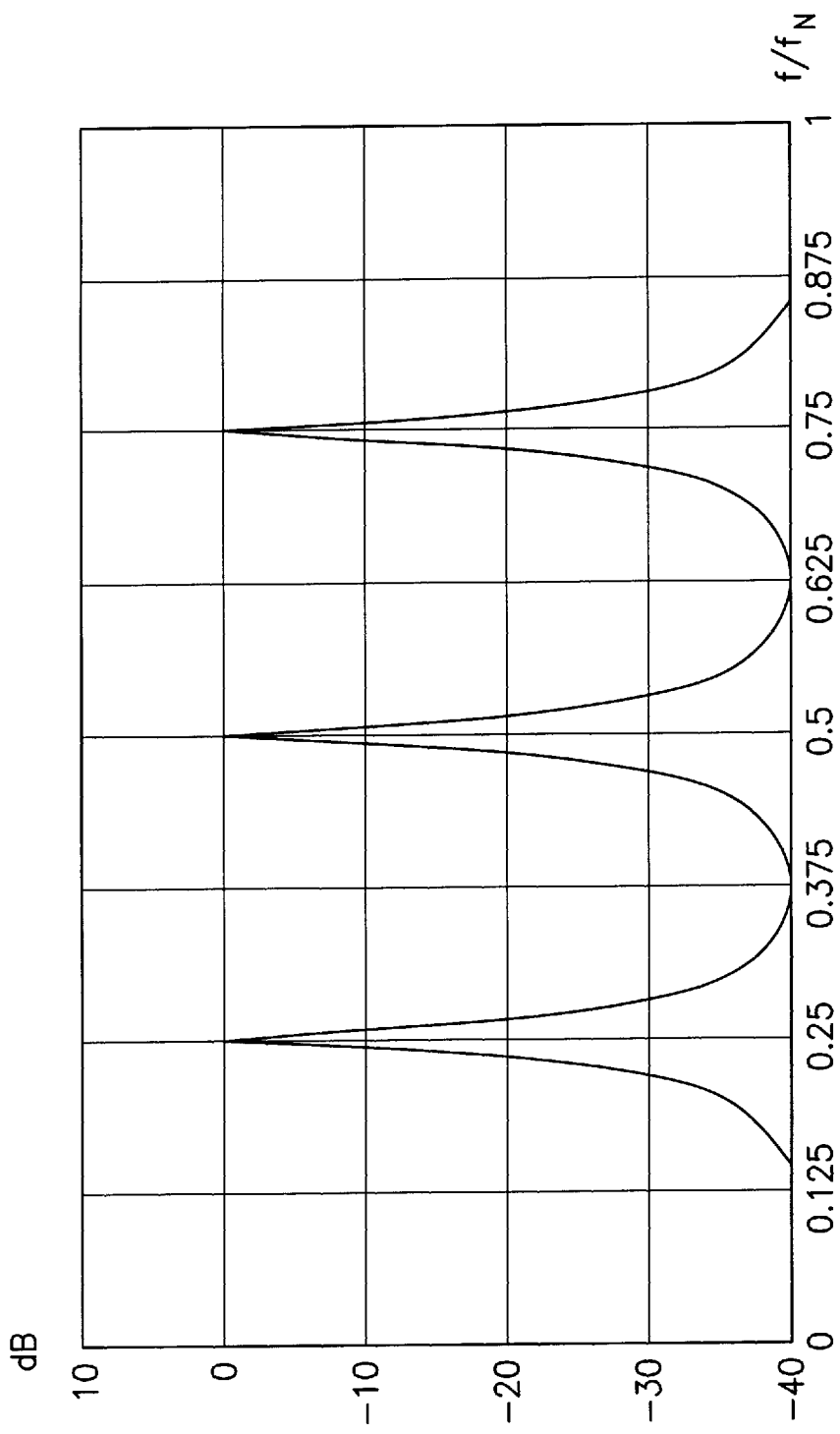
FIG. 3 depicts a spectrum for the low intermediate frequency and one preferred application of the method in connection therewith.

The invention improves this type of overall system in such a manner that, for example, a separate measuring system as shown in FIG. 2 applies e.g. the principle depicted in FIG. 3 for measuring the mean frequency and bandwidth of a signal having the low intermediate frequency 6 and adjusts, on the basis thereof, the voltage-controlled oscillators 4, 8 to what is so close to the correct value that the fixed-rate demodulator 9 is capable locking to the signal.

In further reference to FIG. 2, the sequence of samples is thus preferably guided not only to the demodulator 9 but also to the three power measuring branches 11'. Each branch is first provided with a digital narrow bandpass filter 11a, thereafter a combination logic 11b for calculating the square of a sample value or the instantaneous power. The power values thus measured are averaged by means of low pass filters 11c.

According to FIG. 3, the narrow bandpass filters 11a are tuned to frequencies $\frac{1}{4}f_N$, $\frac{1}{2}f_N$ and $\frac{3}{4}f_N$, wherein $f_N$ is a half of the sample frequency, i.e. the Nyquist frequency.

Operation of the measuring system is controlled by a micro-controller 12 which reads the three measuring results. The controller 12 is provided with software which determines from the measurements in which direction the down-conversion frequency 4 and the sample frequency 8 of an AD converter are to be adjusted in order to make the low intermediate frequency 6 equal to the symbol rate and the sample frequency four times higher than the symbol rate.

Figure 4:
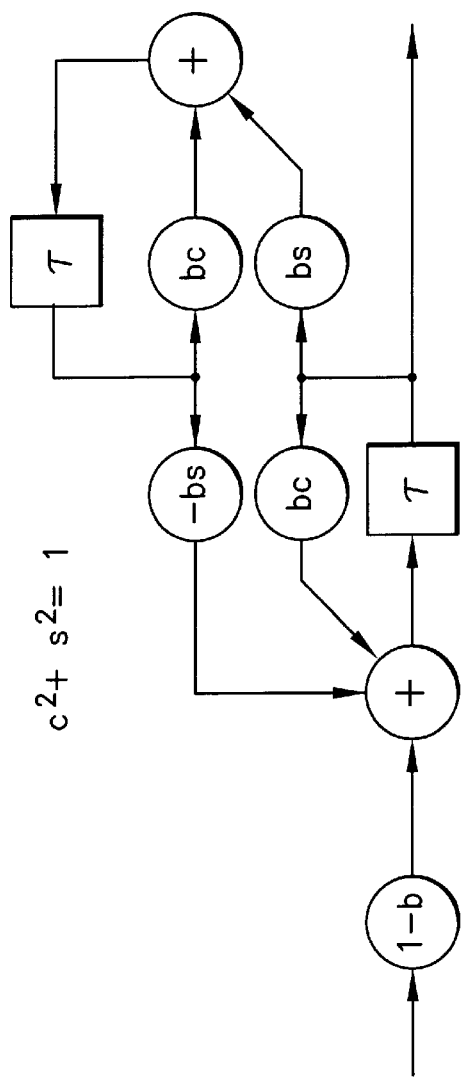
FIG. 4 is a schematic representation of a narrow bandpass filter used in the present invention.

FIG. 4 illustrates the structure of a narrow bandpass filter. The question is about a unipolar IIR type of digital filter. A parameter b is used for selecting transconductance for the filter and mutually linked parameters c and s for selecting a mean frequency. At presently applied frequencies, parameters c and s have the following values:

| frequency | $\frac{1}{4}f_N$ | $\frac{1}{2}f_N$ | $\frac{3}{4}f_N$ |
|---|---|---|---|
| c | $\sqrt{0.5}$ | 0 | $\sqrt{0.5}$ |
| s | $\sqrt{0.5}$ | 1 | $\sqrt{0.5}$ |

Parameter b is selected to be slightly less than one. The closer to one its value is, the narrower band a filter will be obtained. In addition, the selection is preferably effected in such a manner that the factor $b^1 0.5$ can be presented as accurately as possible within the available word length. In the case shown in FIG. 3, parameter b=0.99.

Figure 5:
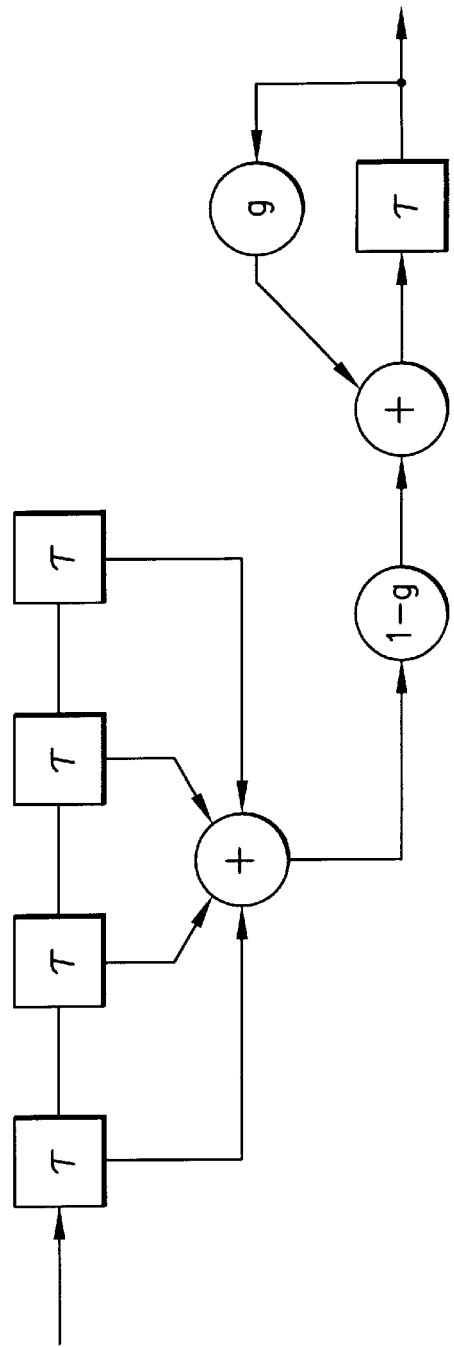
FIG. 5 is a schematic representation of a special low pass filter used for averaging momentary narrow-band outputs of the present invention.

FIG. 5 depicts a special low pass filter used for averaging measured momentary narrow-band outputs. First, four successive samples are summed up. This eliminates the natural momentary sinusoidal fluctuation of momentary output or power at presently used frequencies $\frac{1}{4}f_N$, $\frac{1}{2}f_N$ and $\frac{3}{4}f_N$.

The final step is a simple recursive filtering. Parameter g selects the width of a low passband. The less g falls short of one, the narrower is the band; i.e. the longer is the integration time.

It is naturally obvious that a method of the invention can be applied not only in the foregoing and described embodiments but also in the most diverse of circumstances. Naturally, the depicted exemplary operating charts only represent general operating principles and are not intended to exclude other complementary electronic components for providing possible additional functions. Thus, it is also possible to apply e.g. the measuring system shown in FIG. 2, such that the combination logic and low pass filtering assembly located downstream of the power measuring branches be designed from a single one-piece unit which uses each power measuring branch one at a time, which is of course distinctly slower in its functions than the above-described embodiment.

What is claimed is:

1. A method of receiving a variable-rate transmission signal (1) relating a digital television, video or like image, said signal making use of multi-state modulation, such as a 32QAM, 64QAM demodulator or the like intended for fixed-symbol rate, comprising the steps of:

1) receiving the transmission signal (1);
   2) down-converting the received signal by use of a first oscillation frequency to a fixed standard intermediate frequency (5) of approximately 40 MHz;
   3) band-filtering the down-converted signal;
   4) further down-converting and filtering the intermediate frequency to a so-called low intermediate frequency processed signal (6), having a frequency that is equal to the symbol rate used in image transmission or its low odd multiple;
   5) analog to digital converting the low intermediate frequency signal by synchronization to a second oscillation frequency, so as to obtain samples (X) from the symbol sequence of the processed signal (6); and
   6) regulating the first and second oscillation frequencies so as to maintain symbol synchronization and so as to demodulate the samples (X) from the symbol sequence of the processed signal, and so as minimize the gain error for analog-to-digital conversion; and wherein in order to be able to handle a variable-rate transmission signal, the low intermediate frequency signal (6) mean frequency and bandwidth of its spectrum is measured and the measuring results thereof are used for adjusting the first and second oscillation frequencies near the correct value for demodulating the samples (X) by locking the demodulating step to the signal.

2. A method of receiving a variable-rate transmission signal (1) as set forth in claim 1 wherein the samples (X) picked up from the process signal (6) are power measured with the power measuring results determined thereby representing the transmission signal being used for controlling the frequency of the low intermediate frequency process signal (6) and the second oscillation frequency.

3. A method as defined in claim 2 wherein four samples (X) are picked up from a symbol sequence of the low intermediate frequency process signal (6) so as to demodulate the samples (X), wherein the power measuring results are interpreted so as to adjust the frequency of the first oscillator and the frequency of the second oscillator such that the low intermediate frequency process signal (6) will be substantially equal to the symbol rate and the sample frequency four times higher than the symbol rate.

4. A method as defined in claim 3 wherein the power measuring results are obtained by calculating the power of a sequence of sample values and then averaging the determined power values by means of a low pass filter.

5. A method as defined in claim 4 wherein the power measuring results are obtained by tuning to frequencies of $\frac{1}{4}f_N$, $\frac{1}{2}f_N$ and $\frac{3}{4}f_N$, wherein $f_N$ is a half of the sample frequency, i.e., a so-call Nyquist frequency.

6. A method as defined in claim 2 wherein the measuring results are obtained by calculating the power of a sequence of sample values and then averaging the determined power values by means of a low pass filter.

7. A QAM receiver particularly for using multi-state modulation, such as using a 32QAM, 64QAM using a demodulator or the like intended for a fixed-symbol rate, comprising:

A) a tuner (2) for down-converting a transmission signal (1) relating to a digital television, video or like image to a preferably fixed standard intermediate frequency (5) of approximately 40 MHz;
   B) a first filter (3a) for band filtering the down-converted transmission signal;
   C) a first oscillator (4) and a second filter (3b) for further down-converting and filtering the intermediate frequency signal to a so-called low intermediate frequency processed signal (6) which is equal to the symbol rate used in image transmission or its low odd multiple;
   D) an analog-to-digital (AD) converter (7), under the synchronization of a second oscillator (8), for picking up samples (X) from the symbol sequence of the processed signal (6);
   D) a fixed-rate demodulator (9) for controlling the above-mentioned, preferably voltage-controlled oscillators (4, 8), for maintaining at least the correct tuning and symbol synchronization as well as preferably controlling amplification particularly for minimizing the gain error for analog-to-digital conversion performed by the analog-to-digital converter, wherein, particularly in order to be able to handle a variable-rate transmission signal, the QAM receiver is provided with a measuring system (11) for providing measuring results by measuring the mean frequency and bandwidth of the low intermediate frequency spectrum of the low intermediate frequency signal (6), and for adjusting the first and second oscillators (4, 8) on the basis of the measuring results so that the fixed-rate demodulator (9) is capable of locking to the signal.

8. A QAM receiver as set forth in claim 7, characterized in that the measuring system (11) includes at least three power measuring branches (11'), to which the sequence of samples (X) is adapted to be delivered in addition to the demodulator (9), and the three measuring results determined thereby and representing said transmission signal being used as a basis for controlling said first and second oscillators (4, 8) by means of a micro-controller (12).

9. A QAM receiver as set forth in claim 8, wherein four samples (X) are adapted to be picked up from a symbol sequence of said low intermediate frequency processed signal (6) for the demodulator (9), characterized in that the micro-controller (12) interpreting the measuring results is adapted to adjust at least the frequency of the first oscillator (4) and the frequency of the second oscillator (8) of the AD converter, such that the low intermediate frequency processed signal (6) will be substantially equal to the symbol rate and the sample frequency four times higher than the symbol rate.

10. A QAM receiver as set forth in claim 9, characterized in that each power measuring branch (11') is at least provided with a digital narrow bandpass filter (11a) and thereafter further with a combination logic (11b), preferably one for each power measuring branch, used for calculating a square or instantaneous power of a sample value, and a low pass filter (11c) for averaging the calculated power of the sample values.

11. A QAM receiver as set forth in claim 10, characterized in that the narrow bandpass filters (11*a*) are tuned to frequencies $\frac{1}{4}f_N$, $\frac{1}{2}f_N$, and $\frac{3}{4}f_N$, where $f_N$ is a half of the sample frequency, i.e. a so-called Nyquist frequency.

12. A QAM receiver as set forth in claim 7, characterized in that each power measuring branch (11') is at least provided with a digital narrow bandpass filter (11*a*) and thereafter further with a combination logic (11*b*), preferably one for each power measuring branch, used for calculating the power of a sample value, and a low pass filter (11*c*) for averaging the determined power values.

* * * * *

UNITED STATES PATENT AND TRADEMARK OFFICE
CERTIFICATE OF CORRECTION

PATENT NO. : 5,892,799
DATED : April 6, 1999
INVENTOR(S) : Reijo Jaakkola

It is certified that error appears in the above-identified patent and that said Letters Patent is hereby corrected as shown below:

On patent cover under Foreign Application Priority Data, "Nov. 6, 1996" should be --Nov. 8, 1995--.

On patent cover Abstract [57], line 3, "lator" should be --or--.

Column 5, line 67 (Claim 5, line 4), "so-call" should be --so-called--.

Column 6, line 25 (Claim 7, line 20), "D)" should be --E)--.

Signed and Sealed this

Twenty-second Day of May, 2001

Attest:

NICHOLAS P. GODICI

Attesting Officer         Acting Director of the United States Patent and Trademark Office